(12) United States Patent (10) Patent No.: US 9,239,900 B2
Wang et al. (45) Date of Patent: Jan. 19, 2016

(54) METHOD OF REPEATER CHIP

(71) Applicant: INSPUR ELECTRONIC INFORMATION INDUSTRY CO., LTD, Jinan (CN)

(72) Inventors: Endong Wang, Jinan (CN); Leijun Hu, Jinan (CN); Rengang Li, Jinan (CN)

(73) Assignee: INSPUR ELECTRONIC INFORMATION INDUSTRY CO., LTD., Jinan (CN)

( * ) Notice: Subject to any disclaimer, the term of this patent is extended or adjusted under 35 U.S.C. 154(b) by 0 days.

(21) Appl. No.: 14/534,509

(22) Filed: Nov. 6, 2014

(65) Prior Publication Data

US 2015/0067631 A1 Mar. 5, 2015

Related U.S. Application Data

(63) Continuation of application No. PCT/CN2014/071220, filed on Jan. 23, 2014.

(30) Foreign Application Priority Data

Feb. 20, 2013 (CN) .......................... 2013 1 0053850

(51) Int. Cl.
*G06F 17/50* (2006.01)
*H04L 1/00* (2006.01)
*G06F 17/00* (2006.01)

(52) U.S. Cl.
CPC ............ *G06F 17/5077* (2013.01); *G06F 17/50* (2013.01); *H04L 1/00* (2013.01); *G06F 17/00* (2013.01); *G06F 2217/06* (2013.01)

(58) Field of Classification Search
CPC ... G06F 17/5077; G06F 2217/06; H04B 3/36; H04W 88/04
USPC .............................. 76/110, 126; 716/110, 126
See application file for complete search history.

(56) References Cited

U.S. PATENT DOCUMENTS 5,754,540 A * 5/1998 Liu et al. ........................ 370/315
5,832,244 A * 11/1998 Jolley et al. .................... 710/305

(Continued)

FOREIGN PATENT DOCUMENTS

CN 2423616 3/2001
CN 103152259 6/2013

OTHER PUBLICATIONS

Xuan Al, "Design and Implement of the CAN Repeater Based on the Standalone Twin CAN Controller", Modern Electronic Technique, No. 21, pp. 9-11, figures 1-2, Nov. 1, 2007.

(Continued)

*Primary Examiner* — Sun Lin
(74) *Attorney, Agent, or Firm* — Hamre, Schumann, Mueller & Larson, P.C.

(57) ABSTRACT

A design method of a repeater chip is provided, the repeater chip designed by using the method can implement interconnection among nodes, and implement packet sequence receiving, classifying, storing, forwarding, sorting, and transmitting functions of the repeater chip, thereby implementing effective extension of a high-speed transmission link among the nodes, so as to reduce hardware design difficulties and design risks. The structure of the repeater chip is formed by: an interface detecting unit, a sequence storing unit, a sequence forwarding unit, a sequence determining unit, and a sequence sorting unit.

6 Claims, 1 Drawing Sheet

(56) References Cited

U.S. PATENT DOCUMENTS 7,230,935 B2 * 6/2007 Proctor et al. ............... 370/315
7,415,242 B1 * 8/2008 Ngan ........................ 455/11.1
8,089,913 B2 * 1/2012 Proctor et al. ............... 370/315
8,230,285 B2 * 7/2012 Lanning ...................... 714/734

OTHER PUBLICATIONS

Pan et al., "Design and Application of CAN Bus Repeater Based on STM32", Microcontrollers & Embedded Systems, No. 1, pp. 47-48, figures 3-4, Jan. 31, 2011.

* cited by examiner

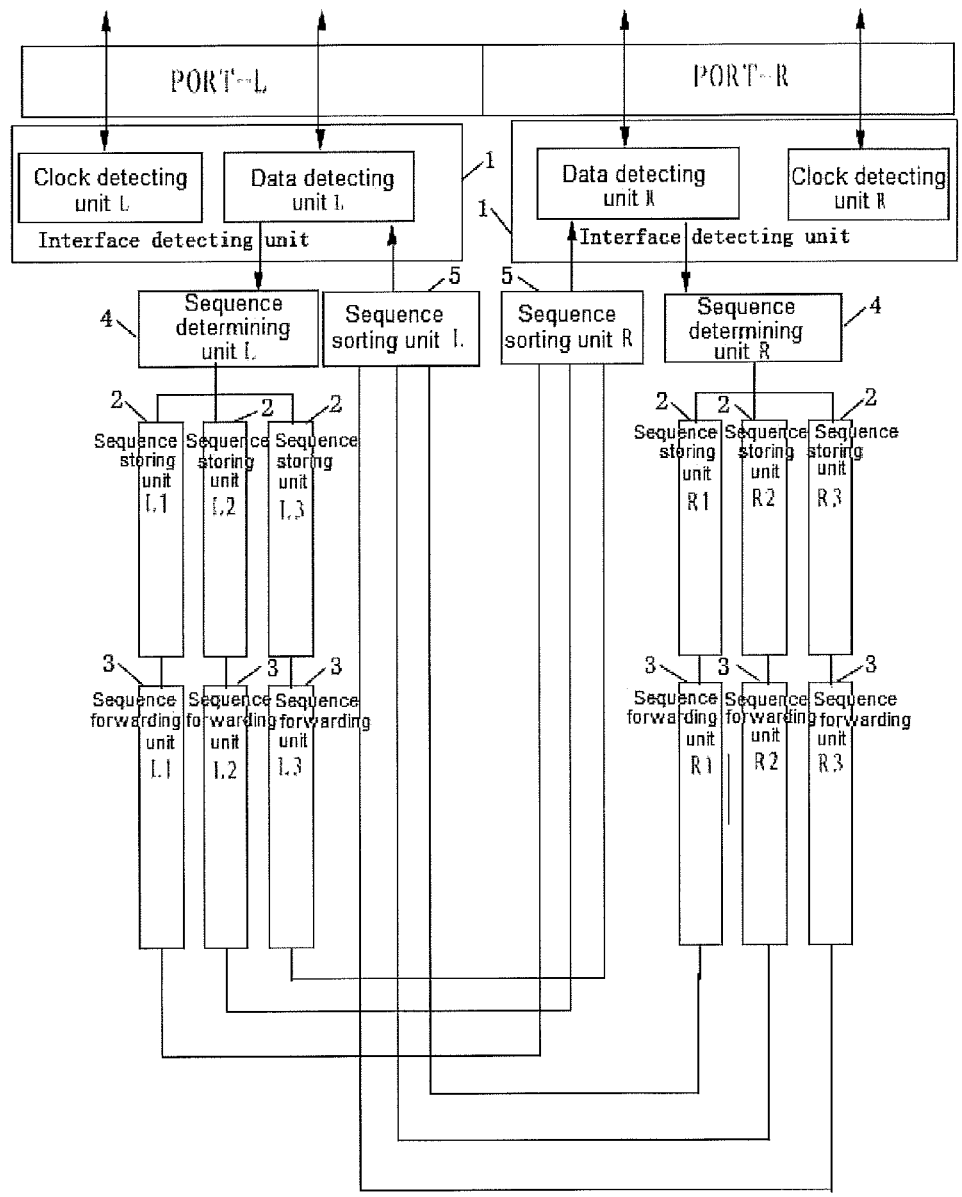

METHOD OF REPEATER CHIP

TECHNICAL FIELD

The disclosure herein relates to the field of high-end server design and the field of large-scale integrated circuit design, and in particular, to a design method of a repeater chip.

BACKGROUND

Along with rapid development of computer technologies and integrated circuit technologies, in order to meet requirements of economic and social development, multi-path computer systems or multi-node interconnection systems become one of bottlenecks in key fields restraining social development. Information fields such as enormous data calculation and data analysis, complicated graphical analysis, and scientific computation have extremely high requirements on performance of a computer system. Therefore, it is required to construct a huge multi-path computer system to better adapt to application requirements of various current fields. However, on the other hand, a technical problem of multi-path computer system interconnection is also encountered, a limited PCB area brings difficulty in designing a multi-path or multi-node interconnection system, and a high-speed interconnection system also designs a specification for a transmission length of a link, which further increases the difficulty in designing the node interconnection system. Adopting a reasonable chip and extending the length of node interconnection trace while meeting the design specification is one of effective methods for effectively reducing design risks and reducing design difficulties.

SUMMARY

Embodiments of design method of a repeater chip are provided.

Some embodiments of implementation method of the repeater chip of the disclosure herein mainly considers influences of hardware design complexity in a multi-path processor system or a multi-node interconnection system, and by adopting the repeater chip, the length of a transmission link may be effectively extended on the basis of meeting design rule requirements, thereby achieving design objectives and reducing design risks and difficulties.

Some embodiments of the design method of the disclosure herein fully considers structure features of a transmission link, especially a transmission characteristic of a high-speed transmission link and hardware design difficulties, a repeater chip is used to receive, classify, store, forward, sort and transmit a packet sequence of interconnected nodes, so as to achieve the objective of prolonging high-speed interconnection hardware traces; a redundancy link and a fault detection link are designed at an interface link at the same time, so as to improve availability and error tolerance of the system.

Some embodiments of the disclosure herein can be implemented in the following manner a repeater chip is used to implement interconnection among nodes, and implement packet sequence receiving, classifying, storing, forwarding, sorting, and transmitting functions of the repeater chip, thereby implementing effective extension of a high-speed transmission link among the nodes, so as to reduce hardware design difficulties and design risks. A structure of the repeater chip includes: (1) an interface detecting unit, (2) a sequence storing unit, (3) a sequence forwarding unit, (4) a sequence determining unit, and (5) a sequence sorting unit, wherein:

For the interface detecting unit (1), according to features of a transmission link of a repeater chip application system, a clock detecting unit and a data detecting unit are designed in the interface detecting unit (1); in a power-on initial period of the system, the transmission link automatically detect connectivity of a link between an interconnection component and the repeater chip, and if a connectivity problem exists, a redundancy link is used to replace the failed link;

For the sequence storing unit (2), the sequence storing unit (2) is implemented by using an FIFO according to function features of the repeater chip, that is, to store packets received by a PORT-L or PORT-R port, and in order to improve the performance of the repeater chip, multiple groups of FIFO storing units are implemented respectively according to different types of the received packets, so as to store various types of packets, where the packet types are distinguished by using the sequence determining unit (4);

For the sequence forwarding unit (3), the received packet sequence, after being stored by the sequence storing unit, is forwarded by the packet sequence forwarding unit (3), where different types of packets are forwarded by using different channels, thereby improving execution efficiency;

For the sequence determining unit (4), to improve the performance of the repeater chip, the sequence determining unit (4) is designed to distinguish effective packets from ineffective packets, and classify the effective packets according to respective types, thereby improving packet sequence processing efficiency of the repeater chip;

For the sequence sorting unit (5), the different types of packets, after being forwarded, are sorted by the sequence sorting unit (5) according to an order of packet transmission and a quantity requirement of the same packets, and then are sent through the PORT-R or PORT-L and transmitted to the other node.

The design of an interface unit structure is required to implement the detection functions of a clock and a data channel in the interface unit according to features of reliability requirements of the multi-path computer system, and when the connectivity of the link is detected as failed, a redundancy design is used to replace the failed channel, thereby achieving the design requirement of high reliability.

The design of the sequence storing unit structure is required to design various types of storage components according to features of design requirements of high performance and high transmission bandwidth of the multi-path computer system, on as to implement respective processing of different packet types, thereby improving the performance of packet processing.

The design of the sequence forwarding unit structure adopts different transmission channels to respectively implement forwarding of different packet types, thereby implementing high-efficient processing of packets.

The design of the sequence determining unit structure adopts a packet screening manner to implement classification of effective packets and ineffective packets, thereby implementing classified management of the effective packets.

The design of the sequence sorting unit structure is required to perform sorting and transmission on the different types of packets and analyze transmission quantity of the same packets according to requirements of system transmission characteristics.

The repeater chip is used to implement interconnection among nodes, thereby implementing effective extension of a high-speed transmission link among the nodes, thereby reducing hardware design difficulties and design risks, and implementing the packet sequence receiving, classifying, storing, forwarding, sorting, and transmitting functions of the repeater chip.

The embodiments of the disclosure herein have the following beneficial effects: the design method of the repeater chip implements integration of a multi-path processor or multi-node interconnection system, effectively implements hardware wiring with high design difficulties, effectively solves the problem of interconnection trace design difficulties and design risks in a multi-path CPU system, and has a high technical value. The repeater chip has an extremely high application value in a interconnection node system with extremely high PCB layout difficulties, can effectively extend trace length between interconnected nodes while meeting wiring rule requirements, thereby greatly reducing the complexity of hardware wiring and reducing the PCB design difficulties and design risks.

BRIEF DESCRIPTION OF THE DRAWINGS

FIG. 1 is a schematic diagram of a repeater chip structure.

DETAILED DESCRIPTION

A design method of a repeater chip in the disclosure herein is described in detail hereinafter with reference to the accompanying drawing.

In an illustrative example as shown in FIG. 1, a structural design of the repeater chip can include: an interface detecting unit 1, a sequence storing unit 2, a sequence forwarding unit 3, a sequence determining unit 4, and a sequence sorting unit 5.

According to features of a repeater chip application system transmission link, in order to improve the availability of the system transmission link and improve error tolerance of the system, a clock detecting unit and a data detecting unit are designed in the interface unit, that is, in a power-on initial period of a system, the transmission link automatically detect connectivity of a link between an interconnection component and the repeater chip, and if a connectivity problem exists, a redundancy link is used to replace the failed link.

In order to improve the performance of the repeater chip, the sequence determining unit is designed to distinguish effective packets from ineffective packets, and classify the effective packets according to respective types, thereby improving packet sequence processing efficiency of the repeater chip.

According to function features of the repeater chip, a FIFO is used to implement the sequence storing unit, that is, to store packets received by a PORT-L or PORT-R port. In order to improve the performance of the repeater chip, multiple groups of FIFO storing units are implemented respectively according to different types of the received packets, so as to store various types of packets, where the packet types are distinguished by using the sequence determining unit.

The received packet sequence, after being stored by the sequence storing unit, is forwarded by the packet sequence forwarding unit, where different types of packets are forwarded by using different channels, thereby improving execution efficiency.

The different types of packets, after being forwarded, are sorted by the sequence sorting unit according to an order of packet transmission and a quantity requirement of the same packets, thereby being sent through the PORT-R or PORT-L, and transmitted to the other node.

The repeater chip has an extremely high application value in an interconnection node system with extremely high PCB layout difficulties, can effectively extend trace length between interconnected nodes while meeting wiring rule requirements, thereby greatly reducing the complexity of hardware wiring and reducing the PCB design difficulties and design risks.

Complexities in hardware design of a multi-path processor system and a multi-node interconnection system, and a PCB area factor and high-speed transmission design rule requirements are taken into full consideration, the repeater chip is used to implement interconnection among nodes, thereby implementing effective extension of a high-speed transmission link among the nodes, and reducing the hardware design difficulties and design risks. The repeater chip implements functions such as packet sequence receiving, classifying, storing, forwarding, sorting, and transmitting.

Except the technical features described in the specification, others are all well-known technologies for persons skilled in the art.

The invention claimed is:

1. A design method of a repeater chip, comprising:
the repeater chip is used to implement interconnections among nodes, and implement a packet sequence receiving, classifying, storing, forwarding, sorting, and transmitting functions of the repeater chip, thereby implementing an effective extension of a high-speed transmission link among the nodes, so as to reduce hardware design difficulties and design risks, and a structure of the repeater chip comprises: an interface detecting unit, a sequence storing unit, a sequence forwarding unit, a sequence determining unit, and a sequence sorting unit, wherein:
for the interface detecting unit, according to features of a transmission link of a repeater chip application system, a clock detecting unit and a data detecting unit are designed in the interface detecting unit; in a power-on initial period of the repeater chip application system, the transmission link automatically detects connectivity of a link between an interconnection component and the repeater chip, and if a connectivity problem exists, a redundancy link is used to replace a failed link;
for the sequence storing unit, the sequence storing unit is implemented by using an FIFO according to function features of the repeater chip, that is, to store packets received by a PORT-L port or a PORT-R port, and in order to improve a performance of the repeater chip, multiple groups of FIFO storing units are implemented respectively according to different packet types of the received packets, so as to store various types of packets, wherein the packet types are distinguished by using the sequence determining unit;
for the sequence forwarding unit, a sequence of the received packet, after being stored by the sequence storing unit, is forwarded by the packet sequence forwarding unit, wherein the different packet types of the received packets are forwarded by using different channels, thereby improving an execution efficiency;
for the sequence determining unit, to improve the performance of the repeater chip, the sequence determining unit is designed to distinguish effective packets from ineffective packets, and classify the effective packets according to respective types, thereby improving a packet sequence processing efficiency of the repeater chip; and
for the sequence sorting unit, the different types of packets, after being forwarded, are sorted by the sequence sorting unit according to an order of packet transmission and a quantity requirement of the same packets, and then are sent through the PORT-R port or the PORT-L port and transmitted to another node.

2. The design method according to claim 1, wherein:
a design structure of the interface detection unit implements detection functions of a clock and a data channel in the interface detection unit according to features of design requirements of high reliability of a multi-path computer system, and when the connectivity of a connectivity of a link of a channel is detected as a failed one, a redundancy design is used to replace the failed channel detected, thereby achieving one of the design requirements of high reliability.

3. The design method according to claim 1, wherein:
a design structure of the sequence storing unit utilizes designs of various types of storage components according to features of design requirements of high performance and high transmission bandwidth of a multi-path computer system, so as to implement respective processing of different packet types, thereby improving performance of the packet processing.

4. The design method according to claim 1, wherein:
a design structure of the sequence forwarding unit adopts different transmission channels to respectively implement forwarding of different packet types, thereby implementing a high-efficient processing of packets.

5. The design method according to claim 1, wherein:
a design structure of the sequence determining unit adopts a packet screening manner to implement classification of effective packets and ineffective packets, thereby implementing a classified management of the effective packets.

6. The design method according to claim 1, wherein:
a design structure of the sequence sorting unit performs sorting based on transmissions of different types of packets and analyzing a transmission quantity of packets of the same type according to requirements of system transmission characteristics.

* * * * *